Patented Mar. 31, 1942

2,277,782

UNITED STATES PATENT OFFICE 2,277,782

CRIMPING MATERIALS CONTAINING SYNTHETIC TEXTILE FIBERS

Edward W. Rugeley, Charleston, W. Va., assignor to Carbide and Carbon Chemicals Corporation, a corporation of New York No Drawing. Application May 3, 1939,
Serial No. 271,511

21 Claims. (Cl. 28—1)

This invention relates to the processing of artificial and natural textile fibers, and it particularly relates to the crimping of materials, including the production of fabrics resembling crepe, which are composed of, or contain, fibers made from certain vinyl resins.

The fibers with which this invention is concerned are those made from vinyl resins having high average macromolecular weights, preferably in excess of 12,000. Molecular weights referred to herein are those calculated by means of Staudinger's formula from viscosity determinations of solutions of the resin. Where the material may be exposed to concentrated ultra-violet light or to elevated temperatures for long periods of time, as is the case with some industrial fabrics, the vinyl resin fibers may be made from certain polyvinyl partial acetal resins. The partial polyvinyl acetal resins may be considered as the reaction products of polymerized vinyl alcohol with an insufficient quantity of one or more aldehydes to acetalize all of the hydroxyl groups of the polyvinyl alcohol. Since two macromolecular equivalents of the monomeric vinyl alcohol, in the polymerized material, will combine with one molecule of aldehyde, the degree to which the aldehyde has been combined with the polyvinyl alcohol may be indicated directly as percent acetalization. The polyvinyl partial acetal resins which are particularly suitable for use in this invention are in general those in which the polyvinyl alcohol has been acetalized, or combined with aldehyde, from about 33% to about 94% with an aliphatic aldehyde having from 2 to 6 carbon atoms, although the degree of acetalization varies to some extent with the aldehyde employed. The preferred resins are those in which the polyvinyl alcohol has been acetalized from 88% to 94% with acetaldehyde, from 52% to 92% with propionaldehyde, from 42% to 82% with butyraldehyde, from 35% to 62% with valeraldehyde, or from about 33% to 45% with hexaldehyde. Of these, the polyvinyl partial acetal resins acetalized with 42% to 82% with butyraldehyde are especially desirable. The polyvinyl alcohol may be acetalized with a mixture of aldehyde, if desired, provided the total acetalization is within the broad range given. The polyvinyl partial acetal resins described are insoluble in water, hydocarbons and ketones and they are soluble in alcohols and water-miscible liquids like the glycol monoalkyl ethers.

However, where vinyl resin fibers of the material must have relatively high strength, and a very high fusion point is not as essential, the most suitable fibers for treatment in accordance with this invention are those made from vinyl ester resins which may result from the conjoint polymerization of vinyl halides with vinyl esters of aliphatic acids, preferably containing between about 70% and about 95% by weight of the vinyl halide in the polymer, since these fibers are the strongest and most durable of any made so far from the vinyl resins. In particular, those resins which may result from the conjoint polymerization of vinyl chloride with vinyl acetate and contain between about 70% and about 95% by weight of vinyl chloride in the polymer are preferred.

Filaments sufficiently fine for use in textiles may be made from the vinyl resins by extruding the resin through small orifices, and collecting the threads thus formed. The resin must, of course, be in a plastic state in order to effect the extrusion, or spinning, of the resin into threads. The most practical method of achieving this is to disperse (or dissolve) the resin in a volatile solvent. In the case of the described resins made by the conjoint polymerization of vinyl halides with vinyl esters of aliphatic acids, the resin may be dispersed in warm, dry acetone, or in othed liquids from which filaments may be formed in the spinning operation. By "dry" acetone is meant this substance which contains less than about 0.60% by weight of water. It has been found that when the acetone used contains water in excess of this amount, the quality of the resin dispersion is materially impaired, and solutions made from such solvents can be filtered and spun only with great difficulty. The concentration of the vinyl resin in the spinning solution is dependent on and varies inversely with the macromolecular weight of the resin, but the resin content ordinarily employed, using acetone as the solvent, is 30% or less by weight. The resulting "dope" is a clear, heavily gelatinous, non-flowing, plastic mass at room temperature, while at a temperature of 50° C. it assumes a very viscous, slowly flowable state. In the practice of this invention, the spinning, or filament extrusion, operation may be carried out in equipment customarily employed for so-called "dry-spinning" of other types of filaments.

The preparation of filaments from the resins resulting from the conjoint polymerization of vinyl halides with vinyl esters of aliphatic acids is described in United States Patent No. 2,161,766, issued June 6, 1939, on an application filed by E. W. Rugeley, T. A. Feild, Jr., and J. F. Conlon, with which this application contains material in common.

After the resin has been spun into filaments, the strength of the yarn may be increased by stretching. For a period after the yarn has been stretched, it shows a marked tendency to contract. This characteristic may, if desired, be readily controlled and modified by a "setting" treatment. The setting of the stretch in the yarn may be accomplished in several ways; for example by prolonged aging of the extended yarn under tension on the stretcher spool, or by subjecting the tensioned yarn to elevated temperatures, which greatly accelerate the rate of setting. However, if the stretched yarn is not subjected to a stretch-setting treatment, or if it is heated to a temperature above that at which it was set, the internal stresses imparted to the yarn by the stretching treatment are, to some extent, released, and the yarn shows a tendency to contract, or shrink, which increases as the temperature to which it is subjected is raised. After the yarn has shrunk as a result of being subjected to elevated temperatures, it no longer shows any tendency to contract when reheated to the same or lower temperature. Alternatively, the internal stresses in the yarn may be released by treatment with a solvent therefor, the action of the solvent being controlled to prevent damage or disintegration of the fibers. It is this shrinkage of the stretched yarn which is utilized in the present invention for the production of crimped fabrics, and which serves to control the porosity of the fabric, to prevent laddering or stitch slippage, to increase the fabric strength and durability, and, in other respects, to improve the properties and appearance of the fabric.

Although fabrics may be made in accordance with this invention by weaving, knitting, or otherwise fashioning the stretched vinyl resin yarn, excellent results can be obtained by incorporating the vinyl resin filaments with other materials. For example, these filaments may be doubled and twisted with yarns of cotton, wool, natural silk, linen, and other natural fibers, or they may be mixed with artificially formed fibers, such as those made from the cellulose derivatives, regenerated silk and cellulose, or both artificial and natural fibers. The process of this invention is especially applicable to the crimping of composite materials comprising fibers of glass, woven, carded, or otherwise intermingled with the vinyl resin fibers, and the materials so made have increased strength and resistance to damage or wear, as compared to the uncrimped materials. For clothing made from composite fabrics, however, the most satisfactory results are obtained by incorporating the vinyl resin filaments with the "cellulosic" fibers, by which is meant cotton, regenerated cellulose and the cellulose derivatives. Where the fibers with which the vinyl resin filaments are to be mixed are staple fibers, the most practical method of combining the two is by stapling the vinyl resin filaments, mixing the stapled filaments with the other fibers, carding the mixture and spinning it into yarn. After formation of the desired material, it may be subjected to an elevated temperature below the softening point of the vinyl resin, but sufficiently high to cause the yarn to shrink. (The softening point is the highest temperature to which a multi-filament vinyl resin yarn may be subjected without altering its filamentary character.) This shrinkage also causes definite crimping of the vinyl resin filaments which firmly interlocks the various fibers in the yarn, thus increasing the fabric strength and durability. In addition, the shrinkage reduces the porosity of the fabric and the added strength obtained by the crimping reduces "laddering" or stitch slippage. This shrinking and crimping may very conveniently be done by immersing the cloth in water, or other fluid medium which will not damage the fibers, maintained at a temperature from about 60° to about 100° C., and preferably between about 70° and about 80° C. At this temperature vinyl resin yarns which have been stretched about 200% or more will shrink about 30% to 40%. If shrinkage as great as this is not desired, the fabric may be subjected to lower temperatures. By regulating this temperature, the degree of shrinkage or crimping and also the porosity of the fabric may be controlled practically at will, provided, however, that the temperature is not allowed to reach or exceed the softening point of the resin. If this is permitted, the resin fibers become tacky and tend to coalesce or fuse together and to adhere to whatever other fibers are present, with the result that the cloth becomes stiffened. This may be desirable, in composite materials, where a shaped and stiffened material is desired, for although the strength of the vinyl resin fibers themselves is reduced, the fabric as a whole shows increased strength, due to the bonding of the other fibers by the fused vinyl resin fibers.

If the shrinking and crimping are to be obtained by means of the solvent treatment, the most practical method is to immerse the material in a mixture of a solvent and non-solvent for the vinyl resin, the concentration of the solvent being insufficient to cause damage to the vinyl resin fibers. The advantage of this method lies in the fact that the shrinking and crimping may be done at room temperature, if desired. Increasing the temperature of the solvent and non-solvent mixture has the same effect as increasing the concentration of the solvent. By adjusting the concentration of the solvent in the mixture and the temperature of the bath, a large part of the advantages of both the thermal treatment and the solvent treatment of the vinyl resin fibers may be achieved. After immersion, the material may be washed and dried.

It is obvious that the process of this invention may be modified in many ways. Instead of combining the vinyl resin filaments with other textile fibers prior to weaving, the vinyl resin filaments may be used in alternation as the warp or filling in the weaving operation and, if desired, the filaments may be twisted prior to incorporation in the fabric. It is not necessary that every warp or filling thread of the fabric should consist of, or contain, the vinyl resin. It suffices if individual threads of vinyl resin are repeated at regular or irregular intervals, the remaining threads of the fabric being of any desired material. In order to obtain special effects, it is also possible to spin the vinyl resin threads with the threads of another material as a preliminary operation, and to weave or otherwise work into a fabric this mixed yarn. Other modifications will be apparent to those skilled in the art, and the invention should not be limited other than as defined by the appended claims.

I claim:
1. Process for modifying the texture (or properties or appearance) of a material, which comprises incorporating in said material stretched textile fibers capable of contraction and made from a vinyl resin having an average macromo- lecular weight of at least 12,000, and at least partially releasing the internal stresses in the vinyl resin fibers whereby said fibers are caused to shrink and become crimped.

2. Process for modifying the texture (or properties or appearance) of a material, which comprises incorporating in said material stretched textile fibers capable of contraction and made from a vinyl resin having an average macromolecular weight of at least 12,000, and subjecting the material to an elevated temperature below the softening point of the vinyl resin but sufficiently high to cause the vinyl resin fibers to shrink and become crimped.

3. Process for modifying the texture (or properties or appearance) of a material, which comprises incorporating in said material stretched textile fibers capable of contraction made from a vinyl resin substantially identical with a polyvinyl partial acetal resin wherein a polyvinyl alcohol has been acetalized with an aldehyde from the group consisting of acetaldehyde from about 88% to 94%, propionaldehyde from about 52% to 92%, butyraldehyde from about 42% to 82%, valeraldehyde from about 35% to 62%, and hexaldehyde from about 33% to 45%; said vinyl resin having an average macromolecular weight of at least 12,000, and subjecting the material to an elevated temperature below the softening point of the vinyl resin but sufficiently high to cause the vinyl resin fibers to shrink and become crimped.

4. Process for modifying the texture (or properties or appearance) of a material, which comprises incorporating in said material stretched textile fibers capable of contraction made from a vinyl resin substantially identical with those which may result from the conjoint polymerization of a vinyl halide with a vinyl ester of an aliphatic acid, and having an average macromolecular weight of at least 12,000, and subjecting the material to an elevated temperature below the softening point of the vinyl resin, but sufficiently high to cause the vinyl resin fibers to shrink and become crimped.

5. Process for modifying the texture (or properties or appearance) of a fabric containing stretched fibers capable of contraction which are made from a vinyl resin substantially identical with those which may result from the conjoint polymerization of a vinyl halide with a vinyl ester of an aliphatic acid, and having an average macromolecular weight of at least 12,000, which comprises heating the fabric to a temperature sufficient to shrink and crimp the fibers, but below their softening point.

6. Process of producing crimped yarn containing stretched fibers capable of contraction made from a vinyl resin substantially identical with those which may result from the conjoint polymerization of a vinyl halide with a vinyl ester of an aliphatic acid, and having an average macromolecular weight of at least 12,000, which comprises heating the yarn to a temperature sufficient to shrink and crimp the vinyl resin fibers, but below their softening point.

7. Process for modifying the texture (or properties or appearance) of a fabric, which comprises incorporating in said fabric stretched textile fibers capable of contraction made from a vinyl resin substantially identical with those which may result from the conjoint polymerization of a vinyl halide with a vinyl ester of an aliphatic acid, containing between about 70% and about 95% by weight of vinyl halide in the poylmer, and having an average macromolecular weight of at least 12,000, and subjecting the fabric to an elevated temperature below the softening point of the vinyl resin, but sufficiently high to cause the vinyl resin fibers to shrink and become crimped.

8. Process for modifying the texture (or properties or appearance) of a fabric comprising cellulosic fibers, which comprises incorporating in said fabric stretched textile fibers capable of contraction made from a vinyl resin substantially identical with those which may result from the conjoint polymerization of a vinyl halide with a vinyl ester of an aliphatic acid, containing between about 70% and about 95% by weight of vinyl halide in the polymer, and having an average macromolecular weight of at least 12,000, and subjecting the fabric to an elevated temperature below the softening point of the vinyl resin, but sufficiently high to cause the vinyl resin fibers to shrink and become crimped.

9. Process for modifying the texture (or properties or appearance) of a fabric comprising cotton, which comprises incorporating in said fabric stretched textile fibers capable of contraction made from a vinyl resin substantially identical with those which may result from the conjoint polymerization of a vinyl halide with a vinyl ester of an aliphatic acid, containing between about 70% and about 95% by weight of vinyl halide in the polymer, and having an average macromolecular weight of at least 12,000, and subjecting the fabric to an elevated temperature below the softening point of the vinyl resin, but sufficiently high to cause the vinyl resin fibers to shrink and become crimped.

10. Process for modifying the texture (or properties or appearance) of a material made of glass fibers, which comprises incorporating in said material stretched textile fibers capable of contraction made from a vinyl resin having an average macromolecular weight of at least 12,000, and subjecting the material to an elevated temperature below the softening point of the vinyl resin, but sufficiently high to cause the vinyl resin fibers to shrink and become crimped.

11. Process for modifying the texture (or properties or appearance) of a material made from glass fibers, which comprises incorporating in said material stretched textile fibers capable of contraction made from a vinyl resin substantially identical with those which may result from the conjoint polymerization of a vinyl halide with a vinyl ester of an aliphatic acid, containing between about 70% and about 95% by weight of vinyl halide in the polymer, and having an average macromolecular weight of at least 12,000, and subjecting the material to an elevated temperature below the softening point of the vinyl resin, but sufficiently high to cause the vinyl resin fibers to shrink and become crimped.

12. Process for modifying the texture (or properties or appearance) of a fabric containing stretched fibers of a vinyl resin substantially identical with those which may result from the conjoint polymerization of a vinyl halide with a vinyl ester of an aliphatic acid, containing between about 70% and about 95% by weight of vinyl halide in the polymer, and having an average macromolecular weight of at least 12,000, which comprises heating the fabric to a temperature sufficient to shrink and crimp the fibers, but below their softening point.

13. Process for modifying the texture (or properties or appearance) of a fabric, which comprises incorporating in said fabric stretched textile fibers made from a vinyl resin formed by the conjoint polymerization of vinyl chloride with vinyl acetate, containing between about 70% and about 95% by weight of vinyl chloride in the polymer, and having an average macromolecular weight of at least 12,000, and subjecting the fabric to an elevated temperature sufficient to shrink and crimp the vinyl resin fibers, but below the softening point of said fibers.

14. Process for modifying the texture (or properties or appearance) of a fabric, which comprises incorporating in said fabric stretched textile fibers made from a vinyl resin formed by the conjoint polymerization of vinyl chloride with vinyl acetate, containing between about 70% and about 95% by weight of vinyl chloride in the polymer, and having an average macromolecular weight of at least 12,000, and immersing the fabric in water maintained at a temperature between about 60° and about 100° C.

15. Materials characterized by reduced porosity, increased strength, durability and resistance to laddering or stitch slippage, which comprise fabrics containing crimped and shrunken filaments of a vinyl resin having an average macromolecular weight of at least 12,000.

16. Materials characterized by reduced porosity, increased strength, durability and resistance to laddering or stitch slippage, which comprise fabrics containing crimped and shrunken filaments of a vinyl resin substantially identical with a resin resulting from the conjoint polymerization of a vinyl halide with a vinyl ester of an aliphatic acid, having an average macromolecular weight of at least 12,000, and containing between about 70% and about 95% by weight of vinyl halide in the polymer.

17. Materials characterized by reduced porosity, increased strength, durability and resistance to laddering or stitch slippage, which comprise a fabric containing crimped and shrunken filaments of a vinyl resin substantially identical with a polyvinyl partial acetal resin wherein a polyvinyl alcohol has been acetalized with an aldehyde from the group consisting of acetaldehyde from about 88% to 94%, propionaldehyde from about 52% to 92%, butyraldehyde from about 42% to 82%, valeraldehyde from about 35% to 62%, and hexaldehyde from about 33% to 45%; said vinyl resin having an average macromolecular weight of at least 12,000.

18. Materials characterized by reduced porosity, increased strength, durability and resistance to laddering or stitch slippage, which comprise fabrics composed of glass fibers and vinyl resin fibers, said vinyl resin fibers being crimped and shrunken filaments of a vinyl resin substantially identical with a resin resulting from the conjoint polymerization of a vinyl halide with a vinyl ester of an aliphatic acid, having an average macromolecular weight of at least 12,000, and containing between about 70 and about 95% by weight of vinyl halide in the polymer.

19. Materials resembling crepe, which comprise yarn made from the group consisting of continuous vinyl resin fibers, vinyl resin staple fibers and mixtures of vinyl resin fibers with other fibers; said vinyl resin fibers being crimped and shrunken filaments of a vinyl resin substantially identical with a resin resulting from the conjoint polymerization of a vinyl halide with a vinyl ester of an aliphatic acid, having an average macromolecular weight of at least 12,000, and containing between about 70% and about 95% by weight of vinyl halide in the polymer; and said materials being characterized by reduced porosity, increased strength, durability and resistance to laddering or stitch slippage.

20. Process for modifying the texture (or properties or appearance) of a material, which comprises incorporating in said material, stretched textile fibers capable of contraction and made from a vinyl resin having an average macromolecular weight of at least 12,000, and subjecting the material to the controlled action of a solvent for the vinyl resin until the vinyl resin fibers shrink and become crimped.

21. Process for modifying the texture (or properties or appearance) of a fabric, which comprises incorporating in said fabric stretched textile fibers capable of contraction made from a vinyl resin substantially identical with those which may result from the conjoint polymerization of a vinyl halide with a vinyl ester of an aliphatic acid, containing between about 70% and about 95% by weight of vinyl halide in the polymer, and having an average macromolecular weight of at least 12,000, and subjecting the fabric to the controlled action of a solvent for the vinyl resin until the vinyl resin fibers shrink and become crimped.

EDWARD W. RUGELEY.